United States Patent
Bigard (10) Patent No.: US 11,235,835 B2
(45) Date of Patent: Feb. 1, 2022

(54) AERODYNAMIC ASSEMBLY FOR BIKE HANDLEBARS

(71) Applicant: LOOK CYCLE INTERNATIONAL, Nevers (FR)

(72) Inventor: Pierre Bigard, Meru (FR)

(73) Assignee: LOOK CYCLE INTERNATIONAL, Nevers (FR)

( * ) Notice: Subject to any disclaimer, the term of this patent is extended or adjusted under 35 U.S.C. 154(b) by 0 days.

(21) Appl. No.: 16/379,092

(22) Filed: Apr. 9, 2019

(65) Prior Publication Data
US 2020/0102046 A1    Apr. 2, 2020

(30) Foreign Application Priority Data

Apr. 12, 2018  (FR) ..................................... 18 53 217

(51) Int. Cl.
*B62K 21/12* (2006.01)
*B62K 21/16* (2006.01)

(52) U.S. Cl.
CPC ............ *B62K 21/125* (2013.01); *B62K 21/16* (2013.01)

(58) Field of Classification Search
CPC .............................. B62K 21/125; B62K 21/16
See application file for complete search history.

(56) References Cited

U.S. PATENT DOCUMENTS

| | | | |
|---|---|---|---|
| 7,698,967 B2* | 4/2010 | Ording | B62K 21/125 74/551.8 |
| 8,172,247 B2* | 5/2012 | Weber | B62K 21/125 280/278 |
| 8,307,736 B2* | 11/2012 | Lin | B62K 21/125 403/314 |
| 8,359,713 B1 | 1/2013 | Chen | |
| 8,850,923 B1* | 10/2014 | Li | B62K 21/125 74/551.8 |
| 9,415,825 B1 | 8/2016 | Salazar | |
| 9,725,129 B2* | 8/2017 | Poole | B62K 21/12 |
| 10,160,510 B1* | 12/2018 | Salazar | B62K 21/125 |

(Continued)

FOREIGN PATENT DOCUMENTS

| | | | | |
|---|---|---|---|---|
| EP | 3552939 A1 | * | 10/2019 | ........... B62K 21/125 |
| FR | 3080085 A1 | * | 10/2019 | ............. B62K 21/16 |

OTHER PUBLICATIONS

International Search Report dated Dec. 12, 2018.
CN Office Action dated Jul. 28, 2021.

*Primary Examiner* — Vicky A Johnson
(74) *Attorney, Agent, or Firm* — Ipsilon USA, LLP (57) ABSTRACT

An aerodynamic assembly for bike handlebars, includes two distinct extension devices (4a, 4b), each of the two extension devices (4a, 4b) having: a first armrest-forming part (5a, 5b), able to be fastened on a transverse bar of a bike handlebars (1) while extending longitudinally forwards and including a longitudinal extension (6a, 6b) forming a free end portion. An upper surface of the first part with its longitudinal extension forming a receiving surface for a forearm part of a cyclist. A second extension-forming part (8a, 8b), able to be fastened, in a removable manner and in the extension of the first part (5a, 5b), to the free end portion, the second extension-forming part (8a, 8b) being able to slide longitudinally relative to said longitudinal extension (6a, 6b) so as to allow an adjustment of a distance separating a free end of the second extension-forming part (8a, 8b) from the first armrest-forming part (5a, 5b).

15 Claims, 7 Drawing Sheets

(56) References Cited

U.S. PATENT DOCUMENTS

| | | | |
|---|---|---|---|
| 2003/0150292 A1 | 8/2003 | Duncan | |
| 2005/0044981 A1* | 3/2005 | Huang | B62K 21/125 74/551.8 |
| 2005/0132839 A1 | 6/2005 | Chen | |
| 2006/0230872 A1 | 10/2006 | Huang | |
| 2007/0151403 A1* | 7/2007 | Andrews | B62K 21/12 74/551.1 |
| 2012/0001402 A1 | 1/2012 | Weber et al. | |
| 2013/0039690 A1 | 2/2013 | Wu et al. | |

* cited by examiner

AERODYNAMIC ASSEMBLY FOR BIKE HANDLEBARS

RELATED APPLICATION

This application claims the benefit of priority from French Patent Application No. 18 53217, filed on Apr. 12, 2018, the entirety of which is incorporated by reference.

BACKGROUND

Field of the Invention

The present invention relates in a general way to bike handlebars, for example time trial or triathlon bikes, and more precisely to the extensions that can be used for the handlebars of such bikes.

Description of the Related Art

Handlebars for time trial bikes allow the cyclist to have two different positions, a first position with the hands placed on the handles of the handlebars, position generally used by the cyclist when starting or for forcing, and a second position with the forearms resting on armrests and the hands placed on extensions. This second position is used by the cyclist so as to hold a cruise speed while assisting the lowering of the torso and bringing the hands and elbows of the cyclist close together, thus improving aerodynamism.

Such handlebars for time trial bikes generally include, in addition to the handlebar part, which conventionally has a transverse bar fastened to the bike, generally by means of a stem, with a zone for taking hold (handle) at each of its two ends:

two extensions assembled on the handlebars, on either side of the stem, extensions that are each terminated by a zone for taking hold;

two armrests each associated with an extension, for acting as a support for the forearms of the cyclist when the latter has their hands on the zones for taking hold of the extensions.

The known embodiments can essentially be grouped into four types:

According to a first type of embodiment, the two extensions used for the same handlebars on one hand, and the two associated armrests on the other, are parts distinct from each other. In this case, the extensions are generally assembled adjustable with respect to the handlebars. Variations of spacing between the two extensions can thus be obtained for example by fastening the extensions at different points over the width of the handlebars. The extensions can also be assembled rotating on the handlebars so as to allow the adjustment of their inclination with respect to the handlebars. One or more wedges of different heights can be used at the fastening point of the handlebars and of each extension so as to allow an adjustment in height of the extensions with respect to the handlebars. For this type of extension, generally presented in the form of an elongated tube, straight, S or elbowed in shape, the length of the extension with respect to its fastening point on the handlebars can only generally be adjusted by cutting the tube of the extension. According to the known embodiments, the armrests are fastened in turn either on the handlebars, or on the extensions, potentially by means of wedges for adjustment in height.

As an example, the document EP 2 402 240 describes a pair of extensions in which each extension is fastened to the transverse bar of the bike handlebars, and an armrest is fastened on each extension, set back with respect to the transverse bar of the handlebars.

A second type of embodiment covers monobloc pieces for which each extension lies in the extension of its associated armrest inside a single piece, which is fastened on the handlebars. In the known embodiments, only the inclination of each extension with respect to the transverse bar of the handlebars and the spacing between the two extensions can be adjusted, but not the length of the extensions.

A third type of embodiment, described for example in the document US 2010/0326232, covers the case of a monobloc plate whose H shape integrates two extensions and two associated armrests, the plate being able to be fastened to the transverse bar of the handlebars. In this type of plate, no adjustment in spacing of the extensions or of the length of the extensions is possible.

More recently finally, a fourth type of embodiment has been proposed, based on monobloc handlebars integrating traditional handles, armrests and extensions in the continuation of the armrests. The handlebars are made to measure so as to suit only one cyclist, and are then produced by 3D printing. No a posteriori adjustment is consequently possible. Such monobloc handlebars are much more ergonomic and aerodynamic than the preceding solutions, but cannot be adapted for a large number of cyclists.

OBJECTS AND SUMMARY

The aim of the present invention is to propose an assembly including two distinct devices, whose structure confers improved aerodynamism compared with the existing solutions, while allowing in particular an adjustment in length making it possible to suit a large number of cyclists of different morphologies.

More precisely, the first object of the invention is an aerodynamic assembly for bike handlebars, the assembly including two distinct extension devices forming a first left extension device and a second right extension device, characterized in that each of the two extension devices comprises:

a first armrest-forming part, able to be fastened on a transverse bar of a bike handlebars while extending longitudinally forwards and including a longitudinal extension forming a free end portion, an upper surface of the first armrest-forming part with its longitudinal extension forming a receiving surface for a forearm part of a cyclist; and a second extension-forming part, able to be fastened, in a removable manner and in the extension of said first armrest-forming part, to said free end portion, the second extension-forming part being able to slide longitudinally relative to said longitudinal extension so as to allow an adjustment of a distance separating a free end from the second extension-forming part of the first armrest-forming part.

In addition to the main characteristics that have just been mentioned in the preceding paragraph, the assembly according to the invention can have one or complementary characteristics among the following:

for each of the two extension devices, an upper surface of the second extension-forming part is preferably substantially in the extension of the upper surface of the first part so as longitudinally to increase the receiving surface for each forearm of a cyclist;

for each of the two extension devices, the upper surface of the first part and the upper surface of the second extension-forming part can be substantially flat, or concave so as to match the shape of a forearm;

for each of the two extension devices, a lower surface of the second extension-forming part is preferably substantially in the extension of a lower surface of the longitudinal extension, and the lower surface of the second extension-forming part and the lower surface of the longitudinal extension are preferably convex;

for each of the two extension devices, the second extension-forming part and said longitudinal extension can advantageously have complementary sections, for example substantially triangular;

for each of the two extension devices, the second extension-forming part can be able to be fastened and to slide longitudinally inside said longitudinal extension; as a variant, the second extension-forming part is able to be fastened and to slide longitudinally on the outside of said longitudinal extension;

for each of the two extension devices, the first armrest-forming part is preferably configured to be fastened to bike handlebars by means of an adjustment system;

each adjustment system can be able to make at least one adjustment among the following adjustments:
- an adjustment by up/down translation allowing an adjustment of the height of each first armrest-forming part with respect to the transverse bar of the handlebars;
- an adjustment by forward/back translation allowing an adjustment of each first armrest-forming part set more or less back or forward of the transverse bar of the handlebars;
- an adjustment by left/right translation allowing an adjustment of the spacing of the first armrest-forming parts along the transverse bar of the handlebars;
- an adjustment by rotation in a horizontal plane allowing the adjustment of a toe-in angle between the two extension devices;
- an adjustment by rotation allowing the adjustment of a support angle of the forearms with respect to horizontal.

each of the two extension devices preferably includes a foam cover able to cover the receiving surface in a removable manner;

for each of the two extension devices, one end of the second extension-forming part is preferably flattened and has an ergonomic shape on which a palm of hand of a cyclist can be supported;

each flattened end can be provided with a through hole allowing a removable fastening of a handle;

each handle is preferably assembled pivoting;

each handle can include a part for taking hold and fastening lugs at the low part, said part for taking hold making an angle with the fastening lugs;

the handles can be interchangeable so as to adjust a toe-in angle between these handles.

Another object of the invention is bike handlebars characterized in that they comprise an assembly according to the first object.

BRIEF DESCRIPTION OF THE DRAWINGS

The invention will be better understood on reading the description that follows of an embodiment, preferred but not at all limitative, of an aerodynamic assembly conforming to the invention, description made with reference to the attached drawings, in which.

DETAILED DESCRIPTION

In the continuation of the description, and unless disposed otherwise, elements common to all of the figures carry the same references.

Figure 1:
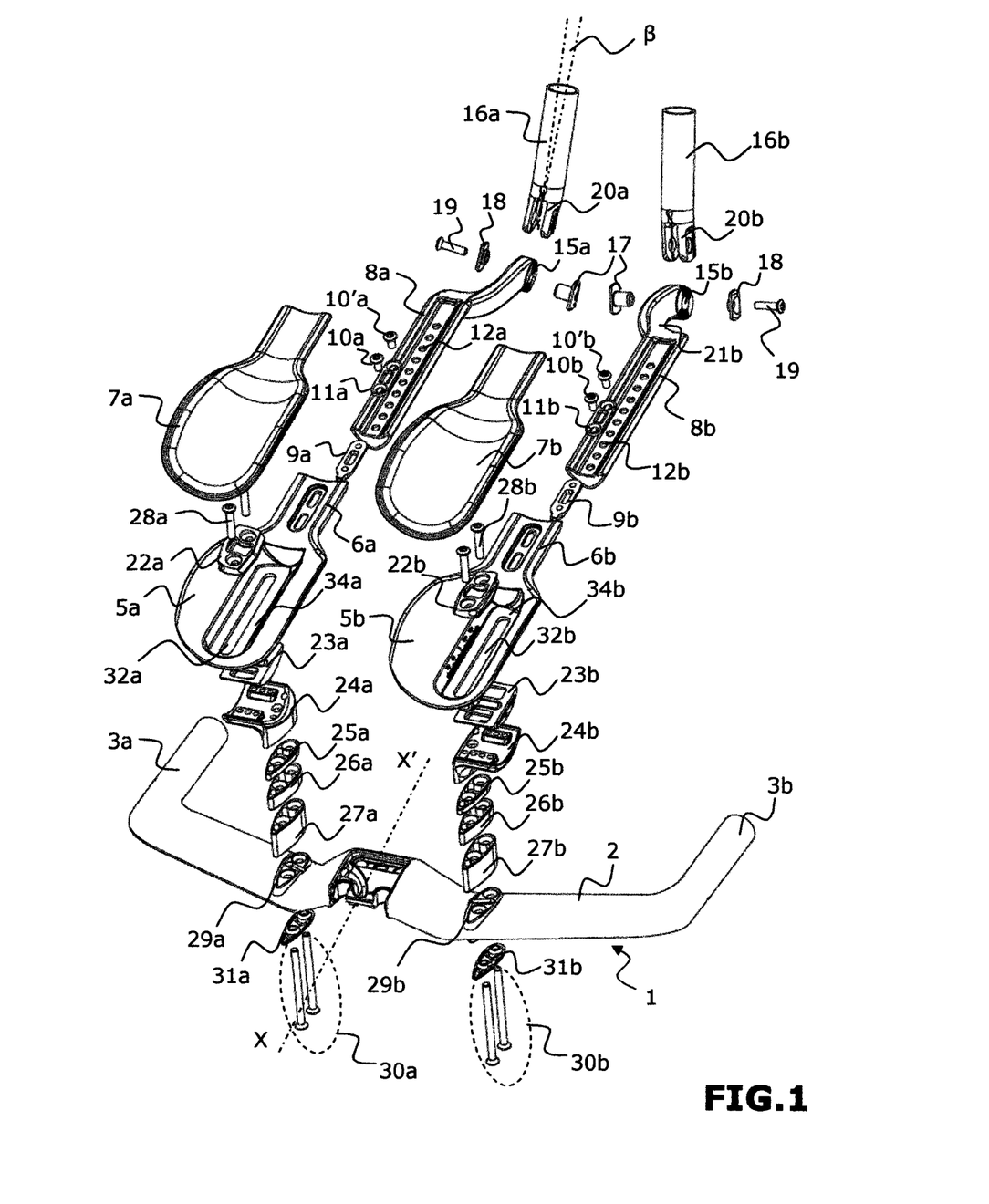
FIG. 1 is an exploded view of the different components of an aerodynamic assembly for bike handlebars conforming to the preferred embodiment of the invention.
Figure 2:
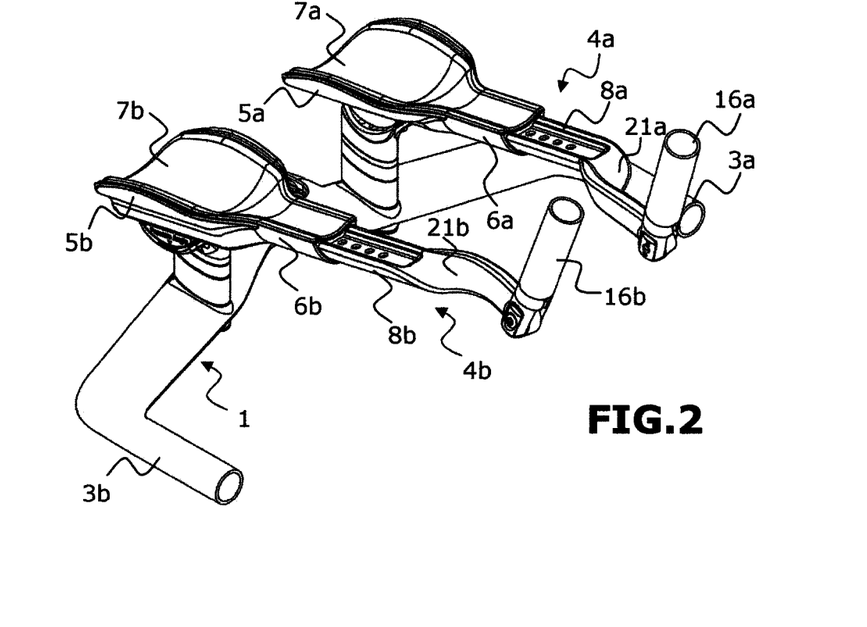
FIG. 2 shows the bike handlebars and the aerodynamic assembly of FIG. 1 in assembled position.

FIGS. 1 and 2 show an aerodynamic assembly for bike handlebars 1, respectively in exploded view and in assembled position. The bike handlebars 1 conventionally include a transverse bar 2, whose central part is fastened to the bike, generally by means of a stem. The transverse bar 2 is extended by a zone for taking hold or handle 3a, 3b at each of its two ends. These handles extend towards the front of the bike, substantially in the longitudinal direction of the bike, materialized on the figure by the longitudinal axis XX'. In the continuation and subject to expressly indicated exceptions, the indices "a" used in the signs of reference to the figures are representative of the parts intended to be situated on the left with respect to the longitudinal axis XX', and the indices "b" used in the signs of reference to the figures are representative of the parts intended to be situated on the right with respect to the longitudinal axis XX'.

The aerodynamic assembly includes, as particularly visible on FIG. 2, two distinct extension devices, namely a first left extension device 4a and a second right extension device 4b.

According to the invention, each of the two extension devices, left 4a and right 4b, comprises a first armrest-forming part 5a, 5b, able to be fastened to the transverse bar 2 of the bike handlebars 1 while extending longitudinally forwards. Each first part 5a, 5b includes a longitudinal extension 6a, 6b forming an end portion free before assembly (see FIG. 1). The upper surface of the first part 5a, 5b with its longitudinal extension 6a, 6b forms a support surface for a left or right forearm part of a cyclist. This support surface can advantageously be covered by a cover 7a, 7b in foam, of the same shape, so as to provide comfort for the cyclist, cover preferably removable as shown on FIG. 1, so as to be easily changed and/or cleaned.

Each of the two extension devices, left 4a and right 4b, furthermore includes a second extension-forming part 8a, 8b, able to be fastened, in a removable manner and in the extension of the first part 5a, 5b, to the free end portion of the longitudinal extension 6a, 6b.

The first armrest-forming parts 5a, 5b and the second extension-forming parts 8a, 8b are preferably made in carbon fibre.

The second extension-forming part 8a, 8b is furthermore able to slide longitudinally relative to the extension 6a, 6b so as to allow, as described in the continuation, an adjustment of the distance separating a free end of the second extension-forming part 8a, 8b of the first armrest-forming part 5a, 5b. In the embodiment shown on the figures, the second extension-forming part 8a, 8b is able to be fastened and to slide longitudinally inside the longitudinal extension 6a, 6b. However, according to variants not shown, it is possible to envisage that the second extension-forming part is able to be fastened and to slide longitudinally on the outside of the longitudinal extension.

Figure 3:
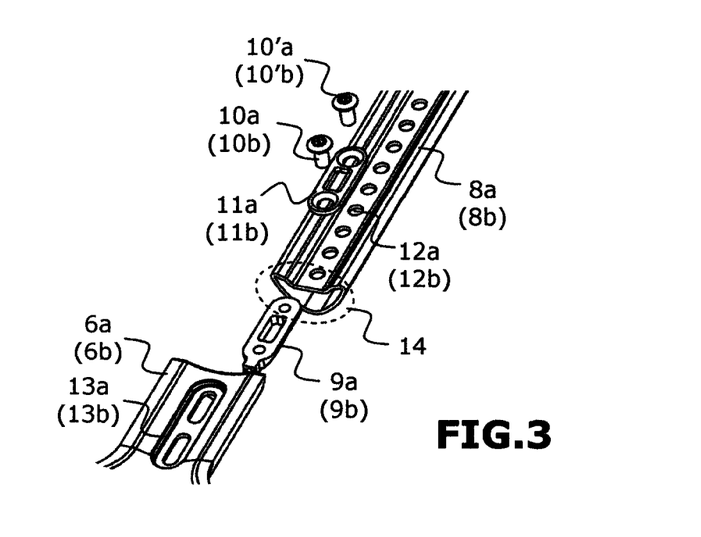
FIG. 3 is a magnified view of a part of FIG. 1.

As more particularly visible on FIGS. 1 and 3, each second extension-forming part 8a, 8b can be fastened to its associated first armrest-forming part 5a, 5b by a system of screws and plates. More precisely, a lower plate 9a, 9b, equipped with two tapped through holes, is housed in a first hollow end of each second extension-forming part 8a, 8b, and two screws 10a, 10'a, 10b, 10'b pass through an upper plate 11a, 11b and the longitudinal extension 6a, 6b so as to be screwed in the tapped through holes of the lower plate 9a, 9b. Several drilled holes 12a, 12b, regularly spaced by a distance corresponding to the distance separating the tapped through holes of the lower plate 9a, 9b, are advantageously provided through the upper surface of the second extension-forming part 8a, 8b. Each cyclist can thus make a first adjustment of the insertion length that is suitable for the morphology of their forearms. For this first adjustment, it may be necessary beforehand to intersect the ends of the second extension-forming parts 8a, 8b between two consecutive drilled holes 12a, 12b. A finer adjustment in length can advantageously be obtained by envisaging, as shown on FIG. 3, that the upper plate 11a, 11b can translate longitudinally inside an opening 13a, 13b, oblong in shape, extending longitudinally on the upper part of the longitudinal extension 6a, 6b.

Furthermore, for each of the two extension devices 4a 4b, the upper surface of the second extension-forming part 8a, 8b is preferably substantially in the extension of the upper surface of the first part 5a, 5b. This makes it possible longitudinally to increase the receiving surface for each forearm of a cyclist.

In an embodiment variant not illustrated, the upper surface of the first part 5a, 5b and the upper surface of the extension-forming second part 8a, 8b are substantially flat.

Figure 4:
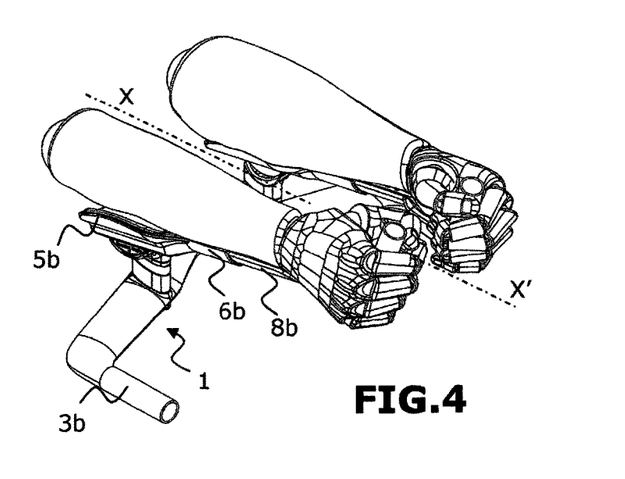
FIGS. 4 and 5 illustrate in perspective and in elevation a position example of the forearms and hands of a cyclist on the aerodynamic assembly equipping the handlebars of FIG. 2.
Figure 5:
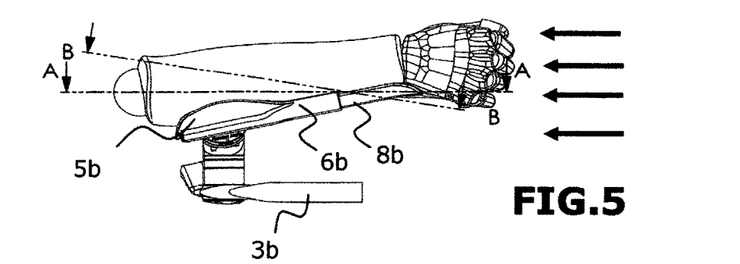

In the illustrated preferred embodiment, for each of the two extension devices 4a, 4b, the upper surface of the first part 5a, 5b and the upper surface of the second extension-forming part 8a, 8b are concave, which makes it possible best to match the shape of a forearm over a large part, perhaps over its entire length, as very particularly visible on FIGS. 4 and 5. This results in improved comfort and perfect support of the forearms.

Furthermore, for each of the two extension devices 4a, 4b, the lower surface of the second extension-forming part 8a, 8b is preferably substantially in the extension of the lower surface of the associated longitudinal extension 6a, 6b, the lower surface of the second extension-forming part 8a, 8b and the lower surface of the longitudinal extension 6a, 6b being advantageously convex so as to form a summit facing the wind.

Figure 6:
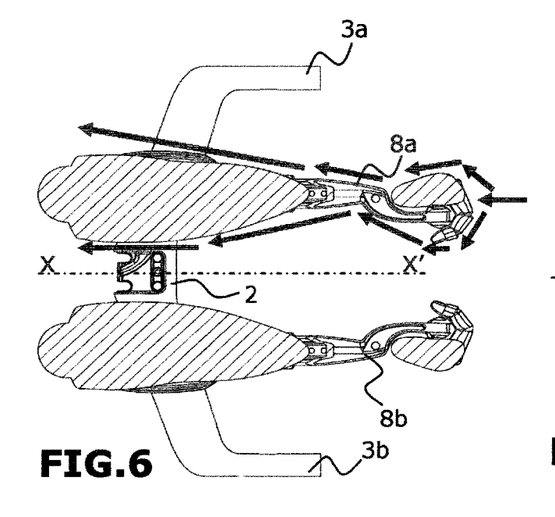
FIG. 6 is a sectional view along the plane AA of FIG. 5.
Figure 7:
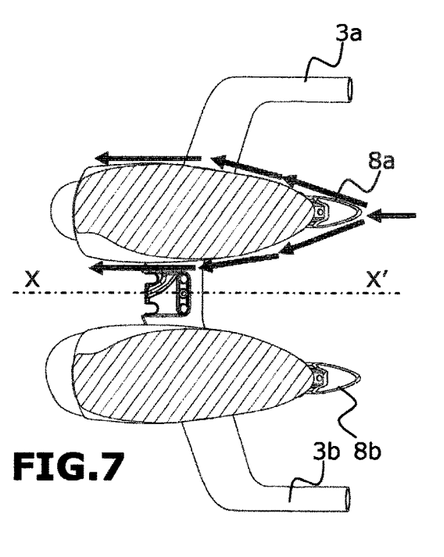
FIG. 7 is a sectional view along the plane BB of FIG. 5.

In the illustrated embodiment, and for each of the two extension devices 4a, 4b, the second extension-forming part 8a, 8b and the associated longitudinal extension 6a, 6b have complementary cross sections, preferably substantially triangular, as particularly visible on FIG. 3 on the zone 14 added as dashes. Such a choice of cross section offers the cyclist a possibility of positioning their forearms in contact over a major part of the length of the extension devices 4a, 4b and confers improved aerodynamism, as visible by the solid line arrows added on FIGS. 5, 6 and 7, which illustrate the trajectory followed by the wind around the forearms of a cyclist when the bike is travelling.

Figure 8A:
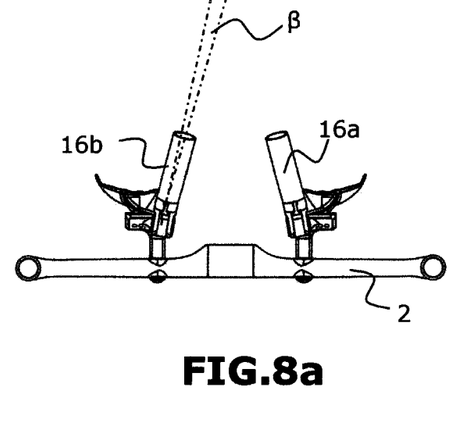
FIGS. 8a and 8b illustrate in front view two positioning examples of the extension devices assembled on the handlebars of FIG. 1.
Figure 8B:
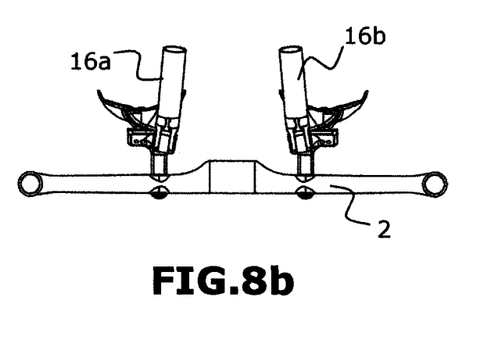

The ends of the extension-forming parts 8a, 8b opposite the handlebars 1 are preferably flattened, inclined towards the inside with respect to the vertical and provided with a through hole 15a, 15b (see FIG. 1) allowing removable fastening of handles 16a, 16b. Each handle 16a, 16b is advantageously assembled pivoting so as to allow an adjustment in inclination, for example by cooperation of a clamping nut 17, a thrust washer 18 and a locking screw 19. As is visible in particular from FIGS. 1, 8a and 8b, the handles 16a, 16b have an angle β of a few degrees between their fastening lugs 20a, 20b at the low part and the part for taking hold. Each handle can thus be turned by 180° around its axis before assembly on its fastening or else, as shown on FIGS. 8a and 8b, the handles 16a, 16b can be reversed. In either case, a modification is obtained of the toe-in position (inclination with respect to the vertical) of these handles.

The flattened zone of the ends opposite the handlebars 1 of the extension-forming parts 8a, 8b of has an ergonomic shape 21a, 21b on which the palm of the hand of the cyclist can advantageously be supported (see in particular FIGS. 1 and 2).

In the preferred embodiment shown on the figures, the first armrest-forming part 5a, 5b of each of the two extension devices 4a, 4b is configured to be fastened to the bike handlebars 1 by means of an adjustment system, a preferred embodiment of which, allowing a large number of adjustments (in addition to the adjustment of the sliding of the extension-forming parts relative to the armrest-forming parts, and of the toe-in angle of the handles described above), will now be described.

In this embodiment, each adjustment system includes (see in particular FIG. 1):

an upper plate 22a, 22b placed at assembly on each first armrest-forming part 5a, 5b;

a cradle 23a, 23b and a cradle support 24a, 24b intended to be placed at assembly under each first part 5a, 5b facing the upper plate 22a, 22b;

a set of several (at least three in the example) wedges 25a, 26a, 27a or 25b, 26b, 27b of variable heights, preferably respectively equal to 5 millimetres, 10 millimetres and 20 millimetres;

locking screws 28a, 28b for assembling the upper plate 22a, 22b, the cradle 23a, 23b and the cradle support 24a, 24b to the armrest-forming part 5a, 5b.

Figure 9:
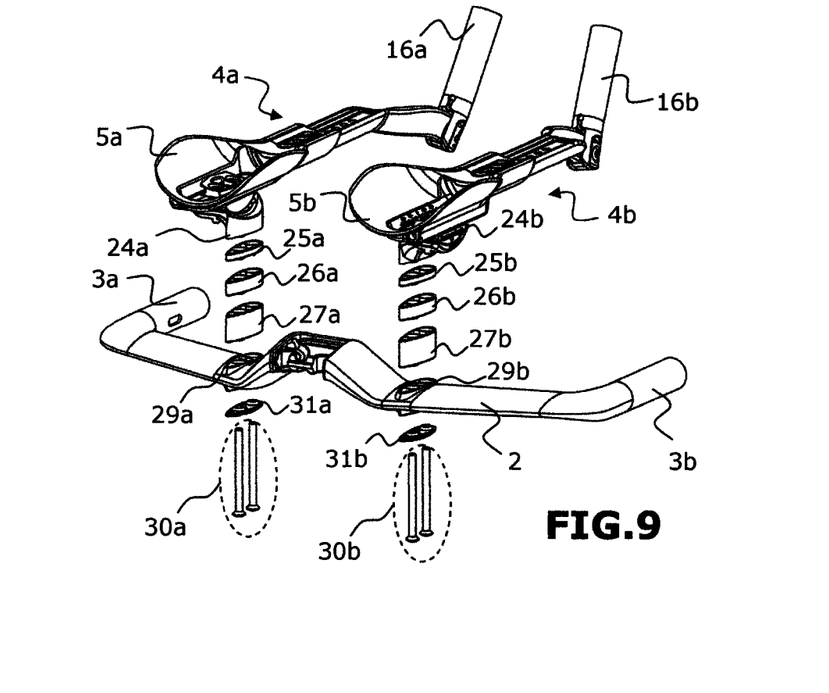
FIG. 9 is a partially exploded view showing the possibilities for adjustments in height of the aerodynamic assembly on the bike handlebars of FIG. 1.

As shown on FIG. 1, and more particularly visible on FIG. 9, the wedges allow each cyclist to adjust the fastening height of each of the extension devices 4a, 4b with respect to the transverse bar 2 of the handlebars 1, at the first armrest-forming part 5a, 5b. The choice of variable heights of 5 millimetres, 10 millimetres and 20 millimetres makes it possible advantageously to obtain heights ranging from 0 to 55 millimetres in steps of 5 millimetres, depending on the combination of wedges used, by providing for each set of right and left wedges, two 5 millimetre wedges, two 10 millimetre wedges and four 20 millimetre wedges (it should be noted that the wedges are interchangeable and can be used either on the right side, or on the left side). The view shown on FIG. 9 corresponds to a height adjustment of 35 millimetres with the combined use of three wedges 25a, 26a, 27a and 25b, 26b, 27b. In this embodiment, the adjustment system and consequently the associated extension devices, are able to be fastened in two dedicated zones 29a, 29b of the transverse bar 2 of the handlebars 1, preferably by means of two screws 30a, 30b for clamping the cradle supports 24a, 24b, whose length depends on the number of wedges used at assembly, and by means of a support plate 31a, 31b making it possible to protect the material of the handlebars 1.

Figure 10A:
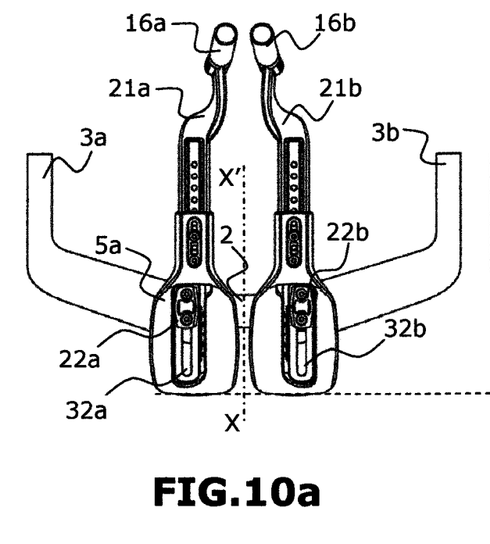
FIGS. 10a and 10b illustrate, in top view, two examples of forward/back adjustment of the extension devices of FIG. 1.
Figure 10B:
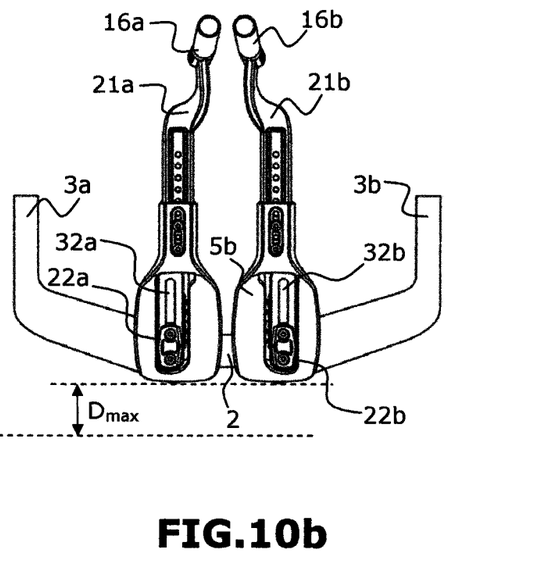

As shown on FIGS. 1, 10a, 10b and 11, the assembly of each upper plate 22a, 22b, the cradle 23a, 23b and the cradle support 24a, 24b to the armrest-forming part 5a, 5b by means of locking screws 28a, 28b is performed through an opening 32a, 32b, oblong in shape, extending longitudinally in the first armrest-forming part 5a, 5b. Each cyclist can thus move the armrest-forming parts 5a, 5b forwards or backwards along an axis transversal to the bar 2 of the handlebars 1 by moving the assembly longitudinally in the oblong opening 32a, 32b before the screws 28a, 28b are tightened. FIGS. 10a, 10b illustrate, in top view, two extreme positions, a first position (FIG. 10a) in which the first parts 5a, 5b are globally retracted towards the rear of the transverse bar 2, and a second position (FIG. 10b) in which the first parts 5a, 5b are globally forward of the transverse bar 2. A total range $D_{max}$ for forward/back translation, equal for example to 55 millimetres, can thus be obtained. The upper plate 22a, 22b can advantageously include a curser for pinpointing on a graduated scale (33a on FIG. 11), so as to assist the cyclist in the forward/back translation adjustment.

Figures 11, 12:
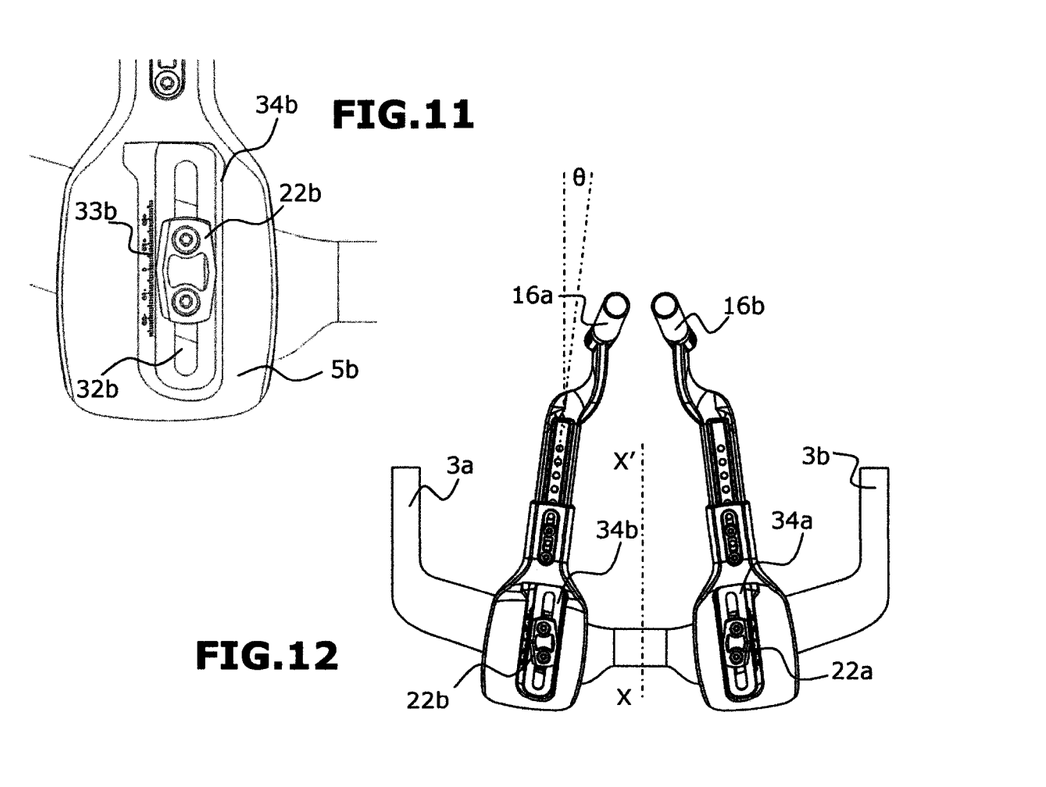
FIG. 11 is a magnified top view of a part of an extension device of FIG. 1.
FIG. 12 illustrates, in top view, an example of adjustment of the toe-in angle between two extension devices.

As shown on FIGS. 1, 11 and 12, the opening 32a, 32b, oblong in shape, extends longitudinally in a housing 34a, 34b of the first armrest-forming part 5a, 5b, this housing 34a, 34b advantageously having a width size larger than the width of the upper plate 22a, 22b. The two extension devices 4a, 4b can thus pivot around the upper plates 22a, 22b, which act as stops, which allows each cyclist to adjust the toe-in angle between the two extension devices 4a, 4b (angle θ on FIG. 12) before the locking screws 28a, 28b are tightened. By correctly dimensioning the width of the housing 34a, 34b with respect to the width of the upper plate 22a, 22b, a range from −7° to +7° around the longitudinal axis of the oblong opening 32a, 32b can for example be obtained for the toe-in angle θ.

Figure 13:
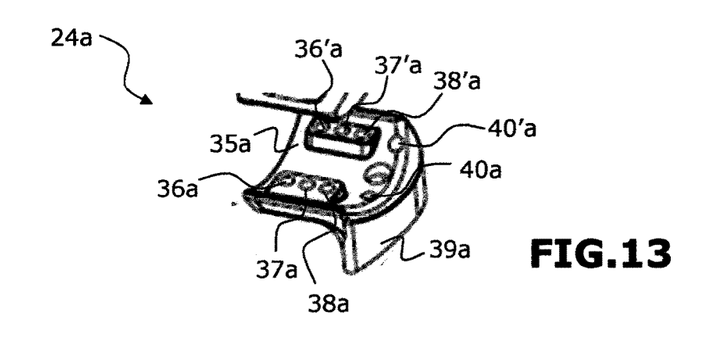
FIG. 13 is a magnified view of a cradle support of FIG. 1.

An adjustment in left/right translation (parallel to the transverse bar 2 of the handlebars 1) of each first armrest-forming part 5a, 5b by the adjustment system is also possible, as will now be described:

FIG. 13 is a magnified view of the cradle support 24a of FIG. 1. The cradle support 24a has a general inverted capital L shape whose base 35a is concave in shape so as to cooperate with the lower convex surface of the associated cradle, and is pierced by two parallel rows of holes facing each other and extending along the base of the L (parallel to the transverse bar 2 of the handlebars 1 after assembly) so as to form pairs accommodating the locking screws 28a. More precisely, it is possible to choose to screw the locking screws 28a either in the pair of holes 36a, 36'a, or in the pair of holes 37a, 37'a, or in the pair of holes 38a, 38'a. The other branch 39a of the inverted L is provided with two other through orifices 40a, 40'a able to receive the locking screws 30a (FIGS. 1 and 9). The cradle support 24b is identical in constitution to the cradle support 24a. However, as visible on FIG. 1, the cradle support 24a has its base offset to the left (with respect to the points for fastening by the locking screws 31a), whereas the cradle support 24b has its base offset to the right. The two supports 24a and 24b are advantageously interchangeable between the two extension devices 4a, 4b, such that it is possible to obtain six possible fastening positions of the first armrest-forming parts 5a, 5b for an adjustment in left/right translation.

Furthermore, the housing 34a, 34b with its associated opening 32a, 32b, oblong in shape, extends parallel to the longitudinal axis of the first armrest-forming part 5a, 5b, but is also offset with respect to this longitudinal axis (offset to the left for the part 5a and offset to the right for the part 5b). The two first parts 5a, 5b are also advantageously interchangeable, namely that the first part 5a can be fastened to the cradle support 24a or to the cradle support 24b and that the first part 5b can be fastened to the cradle support 24a or to the cradle support 24b. The interchangeability of the two cradle supports 24a, 24b on one hand and the two first parts 5a, 5b on the other results in the possibility of obtaining, in the preferred but not limitative embodiment, up to eleven possible fastening positions of the first armrest-forming parts 5a, 5b for the adjustment in left/right translation (parallel to the transverse bar 2 of the handlebars after assembly). Each cyclist can thus find the spacing between the armrest-forming parts that best corresponds to their morphology. In the preferred embodiment, the spacing of the centres of the parts 5a, 5b (centre to centre) can vary between 97.5 millimetres and 205 millimetres per pitch depending on the distance between the holes 36a, 37a, 38a (or 36b, 37b, 38b) and the offset of each housing 34a, 34b with respect to the longitudinal axis of the part 5a, 5b.

Figure 14A:
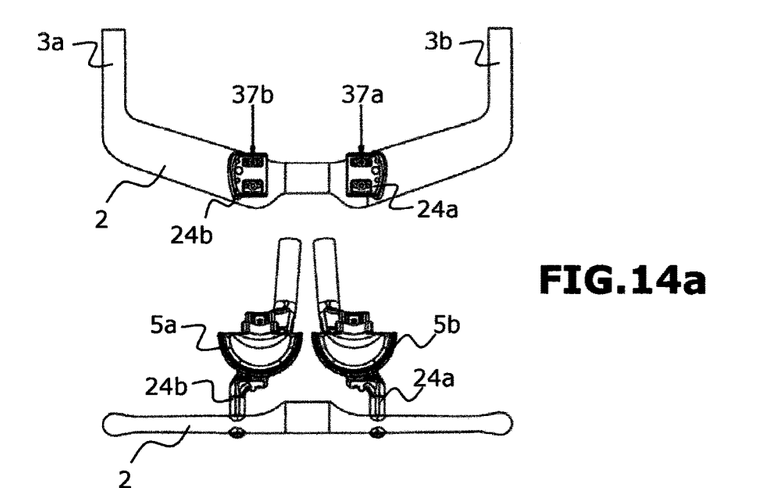
FIG. 14a illustrates, in top and rear view, an example of adjustment of the spacing between the two extension devices of FIG. 1.
Figure 14B:
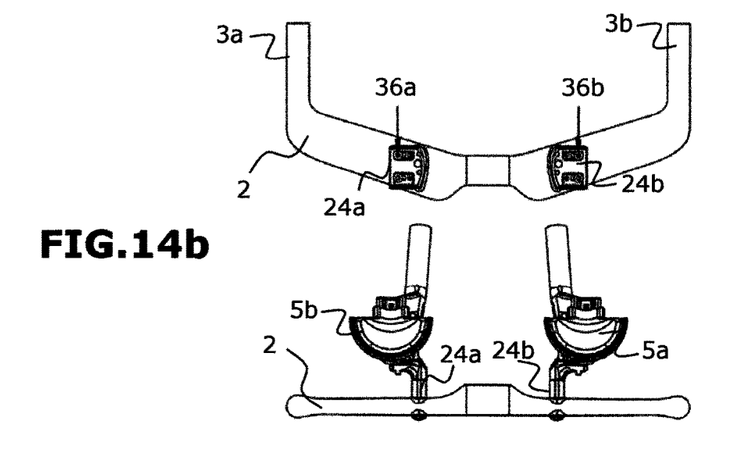
FIG. 14b illustrates, in top and rear view, another example of adjustment of the spacing between the two extension devices of FIG. 1.

FIG. 14a illustrates, in top and rear views of the handlebars, a first position of the adjustment of the spacing corresponding to a small spacing. This spacing position is obtained on one hand by combining the cradle support 24b with offset to the right with the first armrest-forming part 5a and by fastening this combination on the left on the transverse bar 2 with the pair of holes 37b, 37'b (only the hole 37b is referenced so as not to overload the figure), and on the other by combining the cradle support 24a with offset to the left with the first armrest-forming part 5b and by fastening this combination on the right on the transverse bar 2 with the pair of holes 37a, 37'a (only the hole 37a is referenced so as not to overload the figure). FIG. 14b illustrates, in top and rear views of the handlebars, another adjustment position of the spacing corresponding to a maximum spacing. This maximum spacing position is obtained on one hand by combining the cradle support 24a with offset to the left with the first armrest-forming part 5b and by fastening this combination on the left on the transverse bar 2 with the pair of holes 36a, 36'a (only the hole 36a is referenced so as not to overload the figure), and on the other by combining the cradle support 24b with offset to the right with the first armrest-forming part 5a and by fastening this combination on the left on the transverse bar 2 with the pair of holes 36b, 36'b (only the hole 36b is referenced so as not to overload the figure).

Figure 15:
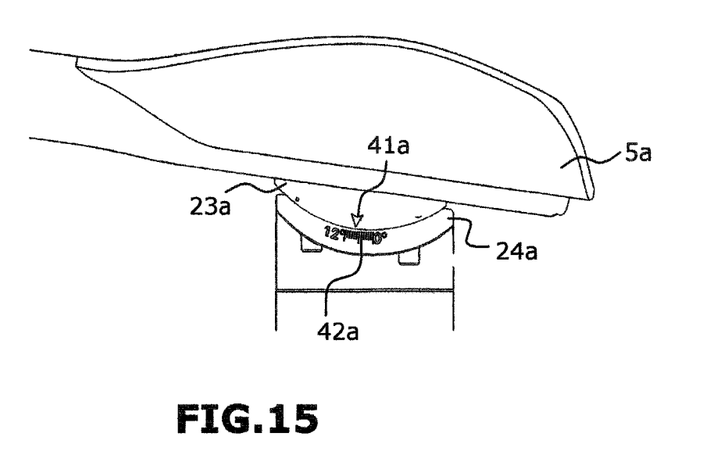
FIG. 15 is a magnified view of a part of FIG. 1, representative of a possibility of adjustment of the support angle of the forearms.

The adjustment system furthermore advantageously allows an adjustment in inclination of each first armrest-forming part 5a, 5b by rotation around an axis substantially parallel to the longitudinal axis of the transverse bar 2. As visible on FIG. 15, this adjustment of the support angle of the forearms is made possible by the cooperation of the lower convex surface of the cradle 23a on the upper surface of the base 35a of the cradle support 24a. A marker 41a on the cradle 23a facing a graduated scale 42a on the cradle support 24a advantageously allows the cyclist to be assisted in this adjustment of the support angle of the forearms. In the preferred embodiment, the angle of inclination can vary in a range from 0° to 12°.

Each adjustment system thus allows several possible adjustments for the position of each first armrest-forming part 5a, 5b (and consequently of each extension device 4a, 4b), namely:

an adjustment by up/down translation allowing the adjustment of the height of each first armrest-forming part 5a, 5b with respect to the transverse bar 2 of the handlebars 1;

an adjustment by forward/back translation along the axis XX' allowing the adjustment of each first armrest-forming part 5a, 5b set more or less back or forward of the transverse bar 2 of the handlebars 1;

an adjustment by left/right translation allowing the adjustment of the spacing of the first armrest-forming parts 5a, 5b along the transverse bar 2 of the handlebars 1;

an adjustment by rotation in a horizontal plane allowing the adjustment of the toe-in angle θ between the two extension devices 4a, 4b;

an adjustment by rotation of the cradles in the associated cradle supports, allowing the adjustment of the support angle of the forearms with respect to horizontal.

Of course, simplified adjustment systems offering only a part of the above adjustment possibilities can also be envisaged.

Other embodiments can also be envisaged for certain adjustments. In particular, a fastening system including a fastening ring that is clipped to the transverse bar of handlebars can make it possible to adjust at the same time the spacing of the extension devices along the bar and the support angle of the forearms.

The invention claimed is:

1. Aerodynamic assembly for a bike handlebar, the assembly including two distinct extension devices forming a first left extension device and a second right extension device, wherein each of the two extension devices comprises:
    a first armrest-forming part, able to be fastened on a transverse bar of a bike handlebars and that extends longitudinally forwards, said first armrest forming part having a longitudinal extension, perpendicularly past said transverse bar, said longitudinal extension terminating in a free open end portion, an upper surface of the first armrest-forming part with said corresponding longitudinal extension together forming a receiving surface for a forearm part of a cyclist; and
    a second extension forming part, fastened, in a removable manner to a corresponding said longitudinal extension, projecting from inside said free open end portion thereof, the second extension-forming part being able to slide longitudinally relative to said longitudinal extension, perpendicular to said transverse bar and extendable further therefrom, allowing an adjustment of a distance separating ends of the second extension-forming part from the said free open end of said first armrest-forming part,
    wherein, for each of the two extension devices, an upper surface of the second extension-forming part is substantially in the extension of the upper surface of the first armrest-forming part so as longitudinally to increase the receiving surface for each forearm of a cyclist and the upper surface of the first armrest-forming part and the upper surface of the second extension-forming part are substantially flat.

2. Aerodynamic assembly according to claim 1, wherein, for each of the two extension devices, a lower surface of the second extension-forming part substantially extends out from a lower surface of the longitudinal extension and wherein the lower surface of the second extension-forming part and the lower surface of the longitudinal extension are convex.

3. Aerodynamic assembly according to claim 1, wherein, for each of the two extension devices, the second extension-forming part and said longitudinal extension have complementary cross sections.

4. Aerodynamic assembly according to claim 3, wherein, for each of the two extension devices, said complementary cross sections are substantially triangular.

5. Aerodynamic assembly according to claim 1, wherein, for each of the two extension devices, the second extension-forming part is able to be fastened and to slide longitudinally inside said longitudinal extension.

6. Aerodynamic assembly according to claim 1, wherein, for each of the two extension devices, the second extension-forming part is able to be fastened and to slide longitudinally on the outside of said longitudinal extension.

7. Aerodynamic assembly according to claim 1, wherein, for each of the two extension devices, the first armrest-forming part is configured to be fastened to the bike handlebar by means of an adjustment system.

8. Aerodynamic assembly according to claim 7, wherein each adjustment system is able to make at least one adjustment among the following adjustments:
    an adjustment by up/down translation allowing an adjustment of the height of each first armrest-forming part with respect to the transverse bar of the handlebar;
    an adjustment by forward/back translation allowing an adjustment of each first armrest-forming part set more or less back or forward of the transverse bar of the handlebar;
    an adjustment by left/right translation allowing an adjustment of the spacing of the first armrest-forming parts along the transverse bar of the handlebar;
    an adjustment by rotation in a horizontal plane allowing the adjustment of a toe-in angle between the two extension devices;
    an adjustment by rotation allowing the adjustment of a support angle of the forearms with respect to horizontal.

9. Aerodynamic assembly according to claim 1, wherein each of the two extension devices includes a foam cover able to cover the receiving surface in a removable manner.

10. Aerodynamic assembly according to claim 1, wherein, for each of the two extension devices, one end of the second extension-forming part is flattened and has an ergonomic shape on which a palm of hand of a cyclist can be supported.

11. Aerodynamic assembly according to claim 10, wherein each flattened end is provided with a through hole allowing a removable fastening of a handle.

12. Aerodynamic assembly according to claim 11, wherein the handles are interchangeable so as to adjust a toe-in angle between these handles.

13. Aerodynamic assembly according to claim 11, wherein each handle is assembled pivoting.

14. Aerodynamic assembly according to claim 10, wherein each handle includes a part for taking hold and fastening lugs at a low part, said part for taking hold making an angle with the fastening lugs.

15. Bike handlebar, wherein said bike handlebars includes two extension devices of an aerodynamic assembly according to claim 1.

\* \* \* \* \*